US007392192B2

(12) United States Patent
Rines

(10) Patent No.: US 7,392,192 B2
(45) Date of Patent: Jun. 24, 2008

(54) METHOD OF AND APPARATUS FOR IMPROVING RESEARCH AND/OR COMMUNICATION INTERACTION WITH ANIMALS SUCH AS DOLPHINS AND THE LIKE, AND PROVIDING MORE FACILE COMMUNICATION WITH HUMANS LACKING SPEAKING CAPABILITY

(76) Inventor: Robert H. Rines, 13 Spaulding Ct., Concord, NH (US)

( * ) Notice: Subject to any disclaimer, the term of this patent is extended or adjusted under 35 U.S.C. 154(b) by 730 days.

(21) Appl. No.: 10/283,008

(22) Filed: Oct. 25, 2002

(65) Prior Publication Data

US 2004/0083106 A1 Apr. 29, 2004

(51) Int. Cl.
*G10L 11/00* (2006.01)
*G10L 15/00* (2006.01)
*G10L 13/00* (2006.01)

(52) U.S. Cl. .................... 704/272; 704/231; 704/258
(58) Field of Classification Search ............... None
See application file for complete search history.

(56) References Cited

U.S. PATENT DOCUMENTS 5,047,952 A * 9/1991 Kramer et al. ............ 704/271

| 5,392,735 | A | * | 2/1995 | Xitco et al. | 119/712 |
| 5,790,033 | A | * | 8/1998 | Yamamoto | 340/573.1 |
| 6,178,923 | B1 | * | 1/2001 | Plotkin | 119/719 |
| 6,496,115 | B2 | * | 12/2002 | Arakawa | 340/573.1 |
| 6,761,131 | B2 | * | 7/2004 | Suzuki | 119/174 |

OTHER PUBLICATIONS

Janik, "Whistle Matching in Wild Bottlenose Dolphins (Trusiops Truncatus)", Science, vol. 289, Issue 5483, Aug. 25, 2000.*

* cited by examiner

*Primary Examiner*—David Hudspeth
*Assistant Examiner*—Brian L. Albertalli
(74) *Attorney, Agent, or Firm*—Rines and Rines

(57) ABSTRACT

A novel method and microprocessor-controlled apparatus are provided for improving research and/or communication interaction between human and animals, such as dolphins and the like, or between normal humans and speech-impaired humans, by playing back audible pre-recorded human-language phrases corresponding to and descriptive of the meaning of sounds and/or gestures or responses produced by the animal or the speech-impaired human and in response to stimuli, conditions or environmental events to which the animal (or impaired human) is subjected, wherein the pre-recorded phrases represent what the human would say or describe if subjected to such stimuli, conditions or environmental events; such that during actual real-time interacting with the animals (or such impaired humans) one actually hears "from" the animal or speech-impaired human, spoken language phrases descriptive of their condition.

23 Claims, 6 Drawing Sheets

Combined Usage of the Systems of FIG. 2 & 3

METHOD OF AND APPARATUS FOR IMPROVING RESEARCH AND/OR COMMUNICATION INTERACTION WITH ANIMALS SUCH AS DOLPHINS AND THE LIKE, AND PROVIDING MORE FACILE COMMUNICATION WITH HUMANS LACKING SPEAKING CAPABILITY

The present invention relates generally to research, training and communication interaction between humans and particularly the more intelligent and communicative of animals, such as dolphins and the like, being also concerned with humans impaired in speaking capability; the invention having more specific concern with converting studied animal or human sounds, gestures, responses, reflexes or movements produced during and associated with different specific behavioral actions, functions, responses or intentions, into human-language words and phrases descriptive of such, so that the researcher or communicator is put in a more useful posture of actual language "communication" as to the meaning of the sounds, gestures, responses or movements as they are produced in real time.

BACKGROUND

Many studies have been conducted with intelligent, responsive and expressive animals, such as dolphins, whales, chimpanzees, gorillas and others, trying to bridge the gap of communication, understanding and interaction with humans. Distinctive audible "clicks" and chirps and other tones have been observed with dolphins in various functional pursuits and responses and such, indeed, have been used to identify some elements of behavior including in popular movies and television programs, such as the noted "Flipper" programs. (See, also, V. M. Janik, Science, Vol. 289,1355 (2000)). The "songs" of whales have been recorded and associated with courting, distress and other behavioral conditions. Somewhat similar sound emissions have also been noted with chimps and other primates, some of which have been stimulated to carry out elementary logic functions.

In all these efforts, however, the human researcher, trainer or communicator, in real-time interaction with the animals, has to re-interpret continually the various familiar sounds or gestures or movements as the animals prepare to perform or do behavioral or responsive patterns associated therewith. If only the animal could tell the human in human language each time it was performing, about to perform, responding to, or intending to embark on some behavioral pattern, or was reacting to conditions or stimuli, the researcher, trainer and/or communicator could be put on a new level of starting point to proceed onward in the interaction.

It is toward this end that the present invention is accordingly directed; the invention, in effect, putting human language utterances descriptive of the animal feelings, condition, needs, action or response effectively "in the mouth" of the animals—or at least making it seem so, for all intents and purposes.

Perhaps more importantly, moreover, the invention also enables more facile "communication" with speech-impaired humans who are deficient at least in speaking capability.

OBJECTS OF INVENTION

It is thus an object of the present invention to provide a new and improved method of and apparatus for improving interactive communication with such intelligent animals as dolphins and the like, through a technique of first correlating specific animal sounds, gestures, responses, reflexes, or behavioral movements with corresponding particular conditions, environmental stimuli, conduct, emotion or responses of the animals, and associating such with corresponding human language sets of words and phrases descriptive thereof; and then emitting such words as if actually "spoken" to the observer by the animal as the animal subsequently produces such sounds, gesture, responses, reflexes or movements in real time as indications of intentions.

A further object is to provide such novel "communication" by a technique that is readily generally adaptable to other intelligent beings, as well—most importantly to humans with speech impairment or incapability; and certainly, also, to other animals than dolphins that have varying degrees of interactable intelligence.

Still another object is to provide an improved facile computer microprocessor-controlled apparatus of this character that gives great flexibility in producing video/audio recordings with such "talking" animals.

Other and further objects will be detailed hereinafter and are more fully delineated in the appended claims.

SUMMARY

In summary, however, from one of its aspects, the invention embraces a method of improving communication and understanding between humans capable of speaking and listening to audible language words and phrases of human-cognitive intelligent meaning, and animals, such as dolphins, capable of producing varied signals including gestures and emitted sounds of human-audible, detectable frequencies and frequencies outside the human-audible range and that are associated with varied animal behavioral functions, responses and intentions, the method comprising, sensing, monitoring and storing varied animal signals including patterns of gestures and/or animal sounds, while observing the corresponding simultaneous varied behavioral functions, responses and intentions associated substantially with such signals and patterns; correlating the stored signals including the sound patterns as observed to be associated with the corresponding behavioral functions, responses and intentions, and creating a stored library data base therefrom; recording in audible human language, sets of words and phrases correspondingly descriptive of what a human might generally audibly say or describe if it were the human who was performing the same behavioral functions, responses and intentions; correlating the varied human language recordings with the varied correlated stored animal signals and patterns in the data base corresponding to those behavioral functions, responses and intentions; associatively storing the correlated recorded human sets of words and phrases in the data base; and, during subsequent real-time interacting with such animals, or studying visual recordings thereof, automatically playing back audibly the correlated recorded set of human words and phrases identifying the animal's actual performance of the corresponding behavioral function, response and intention.

As before stated, the use of the technique of the invention also shows promise in improved communication with incapacitated humans deficient in speaking capability.

Preferred techniques and apparatus design and best modes for the same are hereinafter explained.

DRAWINGS

The invention will now be described in connection with the accompanying drawings, FIG. 1 of which is a combined operational block and flow diagram illustrating the operation of the invention;

DESCRIPTION OF PREFERRED EMBODIMENT(S)

Figure 1:
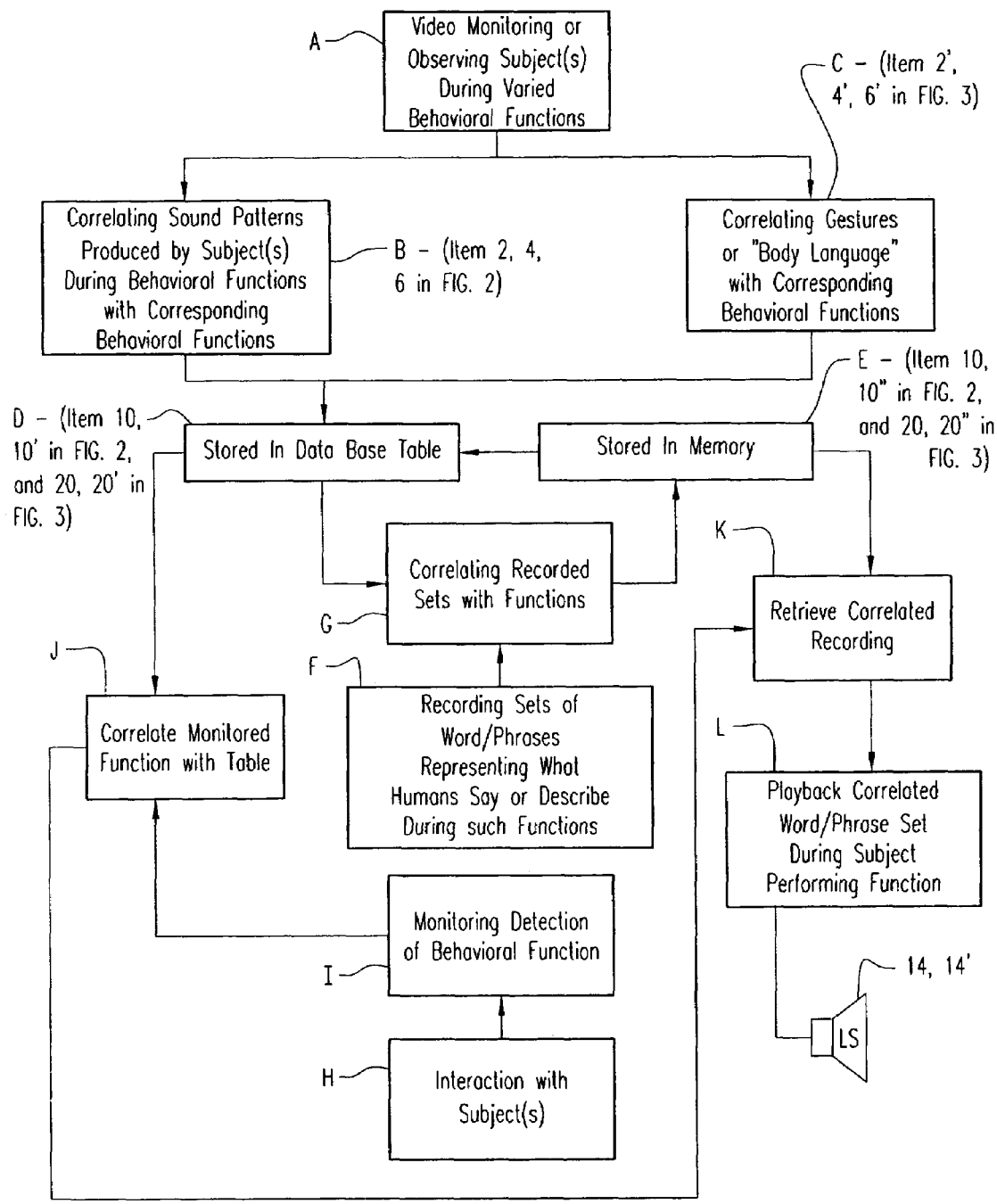

Referring to the flow diagram of FIG. 1, the invention, as before summarized, contemplates creating an extensive stored data base of signals representing sounds and/or gestures, movements or body "language" produced by the subject, such as an intelligent animal or a speech-impaired human, as by video-monitoring or otherwise observing and noting varied behavioral functions, responses, reactions and/or indicated intentions and the like of the subject as in step A, and correlating the sound patterns (step B) and the gesture or body language patterns (step C) with such behavioral functions. A table of such correlations is stored in memory $10$-$10'$, FIG. 2, or $20$-$20'$, FIG. 3 (step D, FIG. 1) of a microprocessor chip 1, FIG. 2, and/or 1', FIG. 3, respectively, as an accessible look-up table.

Figure 2:
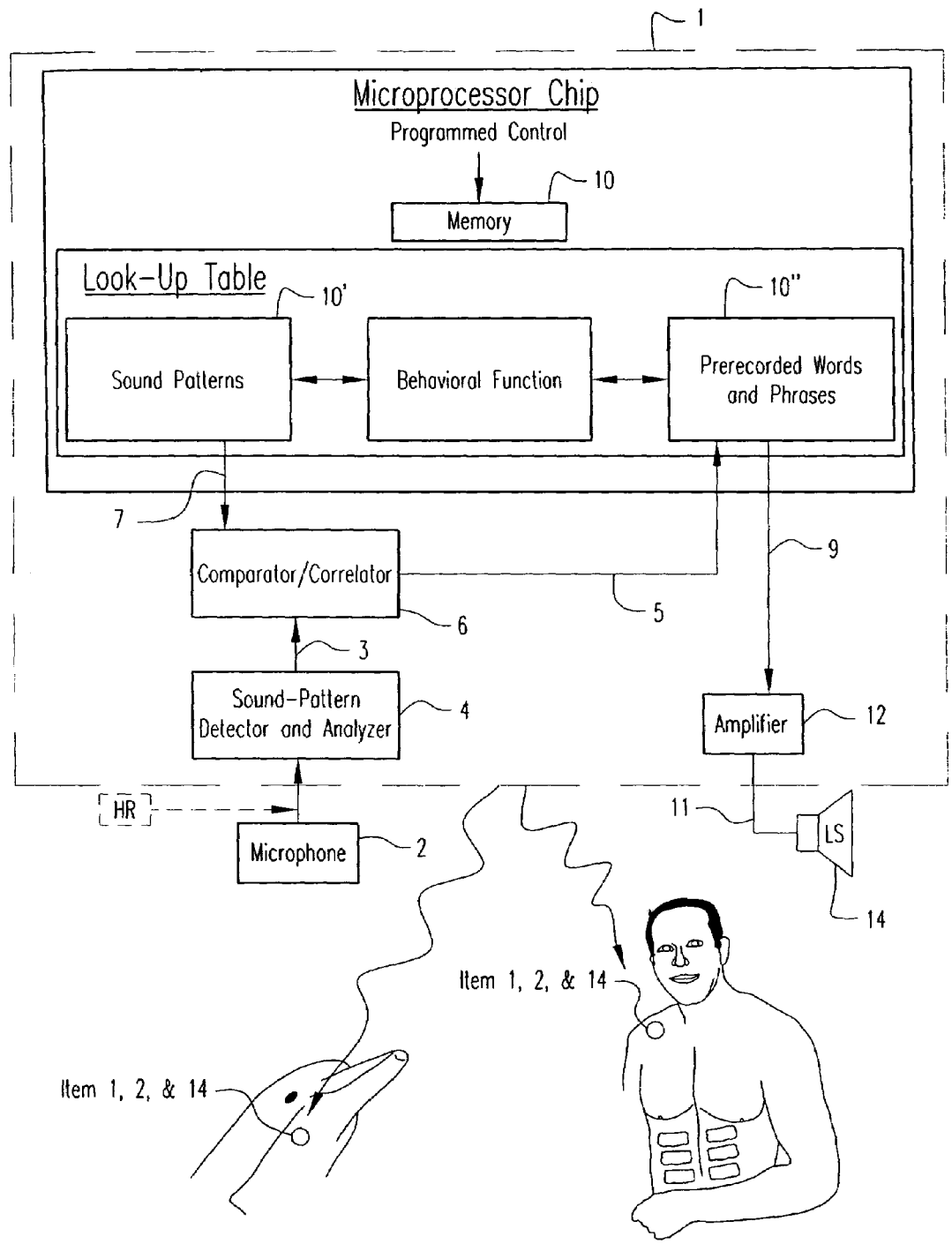
FIG. 2 is a block circuit diagram of preferred apparatus for carrying out the method of the invention with sound emissions from an animal or speaking-impaired human.
Figure 3:
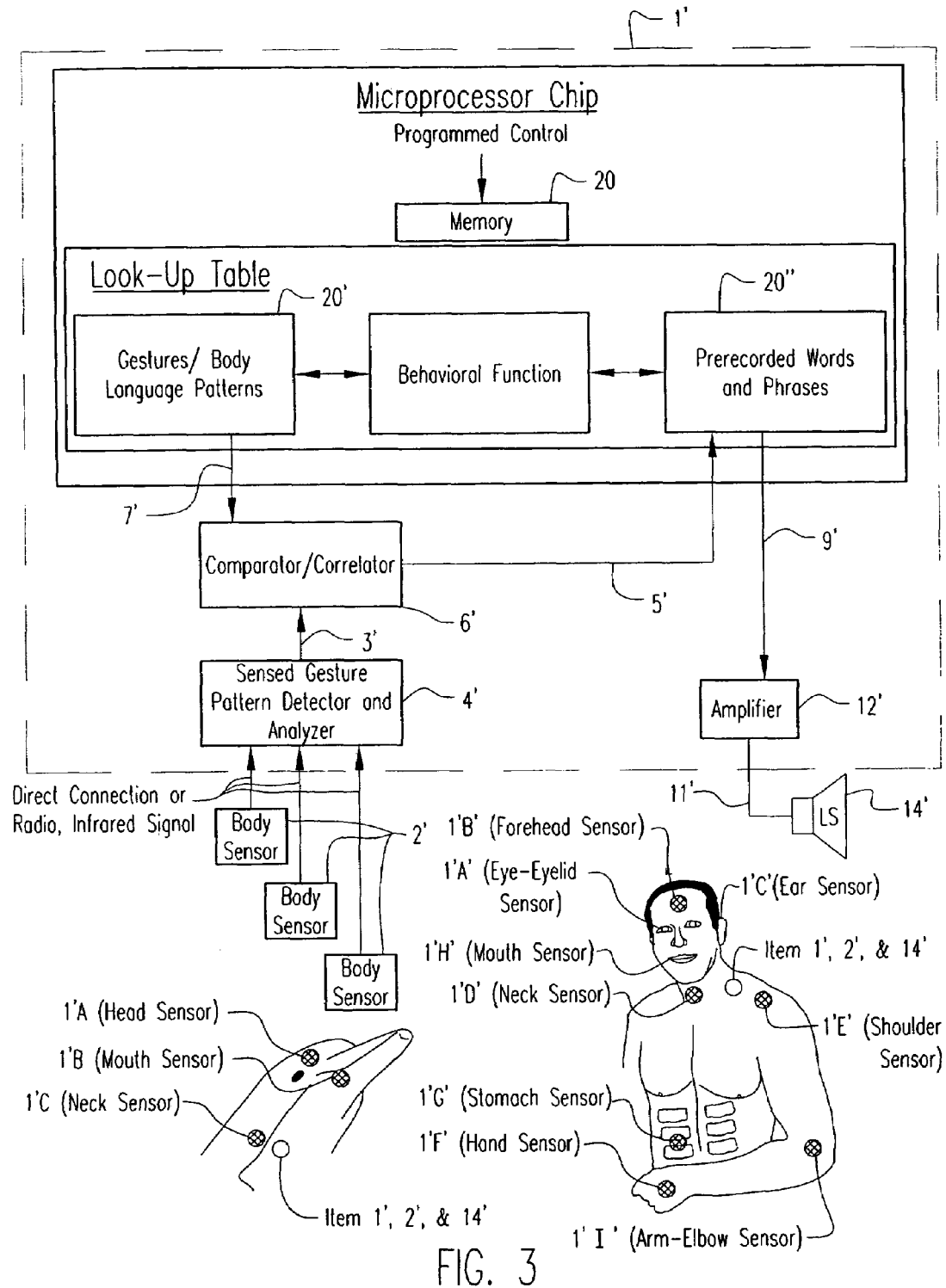
FIG. 3 is a similar diagram for responding to sensed body or body part movement, gestures or body language.
Figure 4:
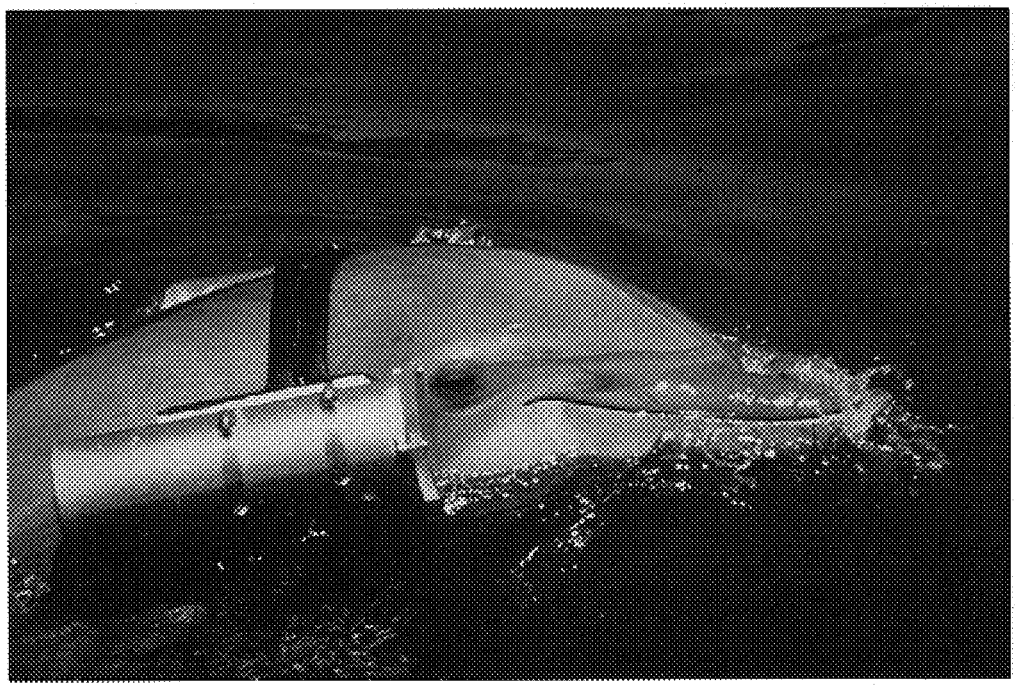
FIG. 4 is a photograph of correlating observations in Islemarada, Fla. of dolphins assisting in research preparations of the Academy of Applied Science for their then intended underwater research at Loch Ness, Scotland, with flashing light-elapsed time camera and sonar-triggering apparatus supported in harness assemblies; (See *Technology Review* (MIT), August/September, 1979, p. 3)

Customary sets of words or phrases, that humans would normally say or describe if it were they who were performing these differing behavioral functions, responses, or intentions and the like, are recorded (step F, FIG. 1), correlated (step G) with the corresponding behavioral functions, etc. and stored in memories $10$-$10^1$, FIG. 2 and/or $20$-$20^1$, FIG. 3. Upon determining a correlation or match, the corresponding pre-recorded set of words and phrases of human language are accessed and retrieved (step K) in the memory $10$-$10^{11}$ and $20$-$20^{11}$ of respective FIGS. 2 and 3, and simultaneously audibly played back (step L) through the loudspeaker(s) $14$ ($14^1$) during the subsequent performing of the behavioral functions, etc., as if the subject were speaking the same. The volume of the playback may be adjusted (amplifier 12, FIG. 2) to mask or override the actual natural subject-emitted sounds so that the illusion of actual human language communication or speaking is created, particularly when the sensing, storage and playback components are positioned on the "person" of the animal so that the "speaking" comes from the animal.

As before explained, this "speaking" raises the posture of the real-time trainer and/or communicator to a level of further exploration and interaction, without having to re-interpret the meaning of previously observed behavioral functions, responses, etc. It also makes it more comfortable and easier to relate to the subject.

The exemplary implementation, parts of which in FIGS. 2 and 3 were earlier referenced, involves a sound sensor or monitor microphone(s) 2, FIG. 2, for picking up the emitted sound signals of the subject during performing the behavioral functions, responses, etc. and applying the same to a detector or receiver 4 for analyzing the received sound pattern and feeding along path 3 to a comparator 6 for seeking possible correlation with a sound pattern earlier stored in the look-up table data base $10$-$10^1$ and applied to the comparator by path 7. Where super-audible sounds are emitted, a well-known heterodyne receiving circuit may beat the same down to the audible range as at HR. In the case of whale or other sub-audible animal sounds, these may also be heterodyned up to the audible range. If there is a match or correlation at 6, an output signal is fed at 5 to the part of the microprocessor memory $10$-$10^{11}$ where the correlated word and phase sets are stored, to select and access the corresponding appropriate word and phrase set which, as retrieved at 9 and fed through amplifier 12, is audibly played as words through loudspeaker 14. By locating such loudspeaker as an implant on the animal, such as on a dolphin as shown in FIG. 2, or near the head of a speech-impaired human, the words will seem to emanate from the respective subjects themselves.

By similar token, in connection with sensing and monitoring gestures, movements and body language associated with correlated behavioral functions, etc., movement transducer sensors $2^1$ are provided, associated with the microprocessor chip1', FIG. 3, and applied, for example, to different parts of the body (shown at $1^1B$ near the dolphin mouth in FIG. 3 and near the head at $1^1A$ and neck at $1^1C$, for example; and near the eyelid or eye at $1^1A^1$ for the speech-impaired human, at the forehead $1^1B^1$, ear $1^1C^1$, mouth $1^1H^1$, neck $1^1D^1$, shoulder $1^1E^1$, arm-elbow $1^1I^1$, hand $1^1F^1$ and stomach $1^1G^1$—all as exemplary locations on the "person"). Correlation at $6^1$ of sensed body part movements with behavioral patterns stored in the table at $20$-$20^1$ will achieve retrieval from the pre-recorded memory bank $20$-$20^{11}$ of the appropriate human language words, and play-back through the amplifier $12^1$ driving loudspeaker $14^1$. The plurality of sensors may have separate chips or all use a common chip, as shown; and a single chip and loudspeaker $14^1$ may service multiple sensors placed at different parts of the body, the sensor signals being transmitted as by radio (wireless), infrared or other communicating transmission to the signal receiver and analyzer $4^1$ of the chip.

Figure 6:
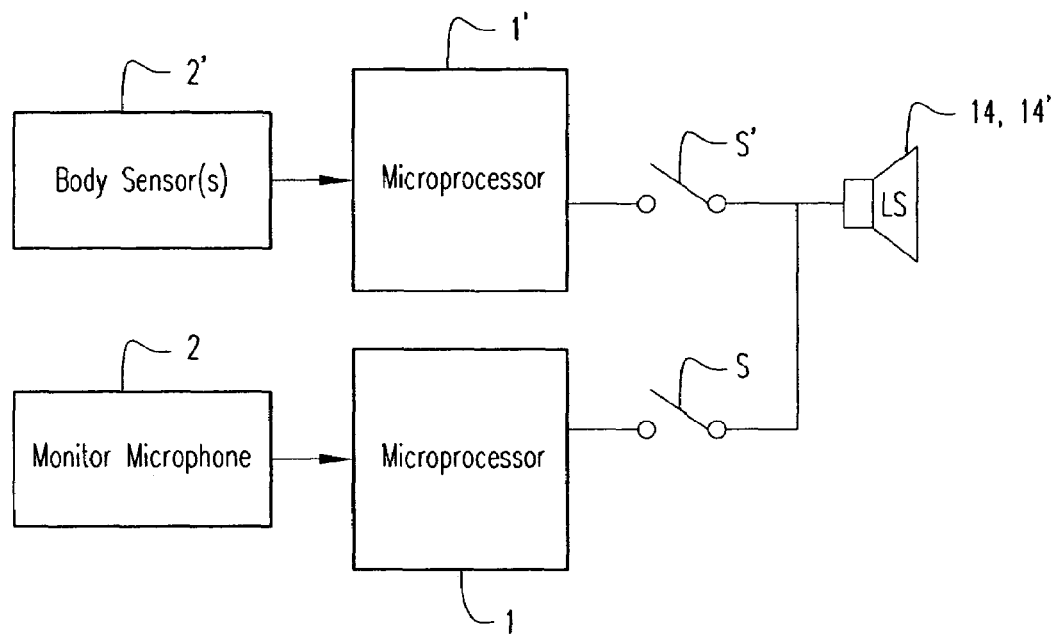
FIG. 6 is a block diagram of an illustration of combined usage of the systems of FIGS. 2 and 3.

As shown in FIG. 6, moreover, both sounds and gestures may be monitored together as well as separately by operation of switches $S$-$S^1$, and with a list, for example, of dolphin sound and gesture and/or body language actions noted to be correlated with corresponding behavioral functions, some of which were earlier noted in said Academy of Applied Science Islamorada tests, being presented in Tables A and B below as illustrations:

TABLE A

| Observed and/or Detected Distinctive Sound Pattern | Observed Correlated Function, Response or Intention | Correlated Created Human Voice Recording For Playback |
| --- | --- | --- |
| 1. After towing a dingy by rope, dolphin head surfaced with a single clack in audible frequency range (microphone 2, FIG. 2) | 1. Conditioned for fish to be fed (stored in look-up table $10^1$, FIG. 2) | 1. "I'd like my fish". (Stored in $10^{11}$, FIG. 2) |
| 2. Submerging horizontally and then starting frequency - modulated pulsing in 35-40 kHz range - apparently sonar (microphone 2 and heterodyne receiver HR associated with sound pattern analyzer 4, FIG. 2) | 2. Either about to swim away close to and along an embankment or in close formation with another dolphin | 2. "I'm taking off". ($10^{11}$) |

Figure 5:
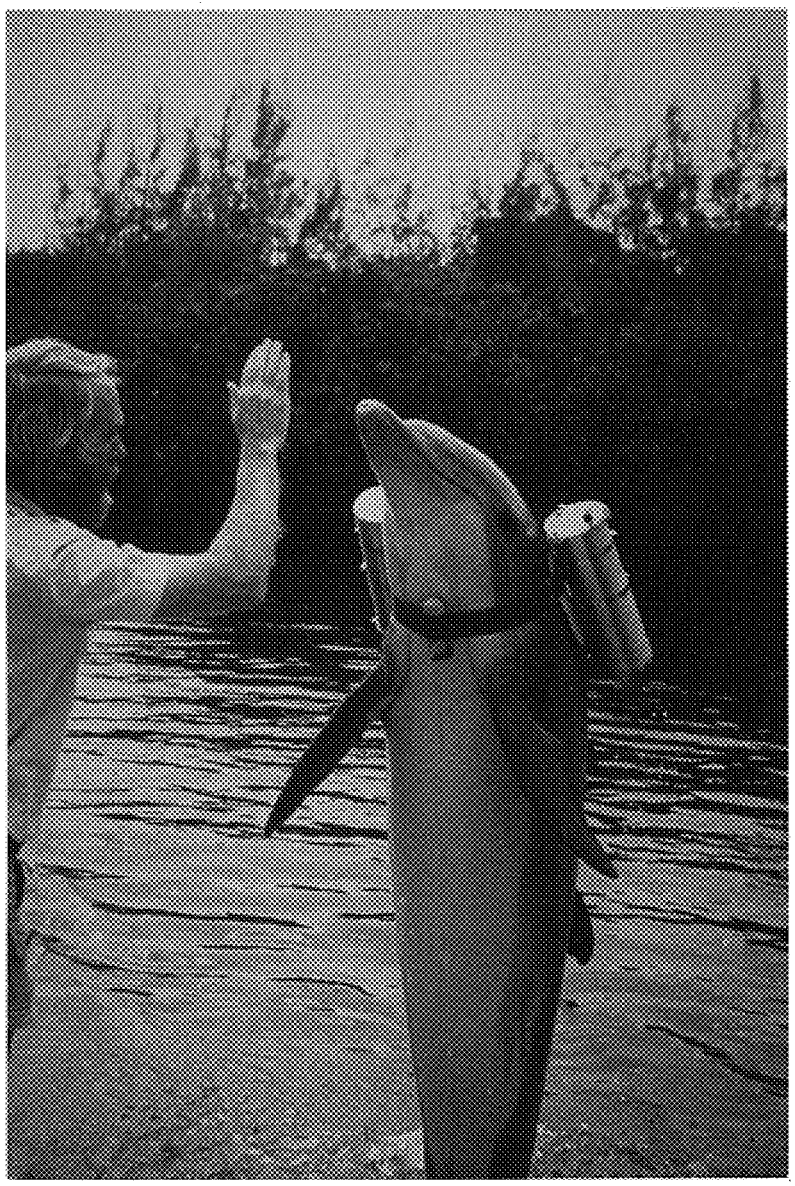
FIG. 5 is a photograph of the dolphin trained to conduct a behavioral response of leaping out of the water to take a picture by the camera of FIG. 4 of the trainer.

| Observed Distinctive Gesture or Body Language | Observed Behavioral Function or Intention | |
| --- | --- | --- |
| 1. After towing dinghy by rope, nudging side of dinghy by head and surfacing while opening mouth (angles of about 20-30°) and single clack | 1. Conditioned for fish as prelude to picking up rope in mouth and continuing towing | 1. "I'll pull you further when you feed me fish". |
| 2. With permanent harness assembly around head in back of eyes, carrying flash camera and sonar trigger cylinders, restricted underwater swimming consistently at or under ½ knot | 2. Total slow-down of swimming and in following conditioned travel sequences | 2. "I'm not comfortable carrying this equipment in this position". |
| 3. Picking up a voluntary camera-carrying assembly after noting the voluntary nature of its ready applying and dropping, and underwater swimming resuming at =/>3 knots with the camera assembly | 3. a) Ready picking up of harness with equipment (camera) assembly and swimming into it and underwater with same (See Technology Review article, supra)<br>b) Ready self-removing of harness assembly to float the equipment | 3. a) "I'll pick up the gear and explore underwater".<br><br><br><br>b) "Enough for now." |
| 4. Eyelid blinking at flashing rate of carried strobe rapid elapsed-time camera (once/per 3 seconds) | 4. Slow travel; sluggish | 4. "This flashing light is bothering me." |
| 5. Fast travel as if no flashing equipment were being carried upon adjusting harness-strapped camera to nearer belly | 5. Normal fast travel, ignoring carried equipment | 5. "I'm comfortable with the equipment. No bother." |
| 6. Upon hand signal, vertical jump out of water directly in front of trainer carrying automatic camera assembly facing trainer. | 6. Breaking water in vertical posture facing trainer (FIG. 5) | 6. "Taking your picture." |

TABLE B

Few Exemplary Sound and/or Gesture Correlations With Behavioral Function, Condition, Response Expression and/or Intention, And Corresponding Human Voice Recordings For Playback.

| Sound And/Or Gesture Pattern | Speech-Incapacitated Human Behavioral Function Condition Response, Intention | Correlated Human Voice Recording For Playback |
| --- | --- | --- |
| 1A. Wincing (sensors $1^1H^1$ and $1^1B^1$, FIG. 3) accompanied by stomach muscle contractions (sensor $1^1G^1$) and/or hand on stomach (sensor $1^1F^1$) | 1. Stomach ache | 1. "I have stomach pains" ("upset tummy"). |
| 1B. Low grunt or groan sounds (microphone 2, FIG. 2) while stomach muscle contractions (sensor $1^1G^1$, FIG. 3) | 1. Stomach ache | 1. "I have stomach pains" ("upset tummy"). |
| 2. Scowling ($1^1B^1$) | 2. Headache | 2. "My head aches". |
| 3. Squinting (eye sensors $1^1A^1$, FIG. 3) | 3. Bright light disturbance | 3. "The light's bothering me". |

TABLE B-continued

Few Exemplary Sound and/or Gesture Correlations With Behavioral Function,
Condition, Response Expression and/or Intention, And Corresponding Human
Voice Recordings For Playback.

| Sound And/Or Gesture Pattern | Speech-Incapacitated Human Behavioral Function Condition Response, Intention | Correlated Human Voice Recording For Playback |
|---|---|---|
| 4. Grasping one arm with other hand (sensor $1^1I^1$, FIG. 3) and/or groan (microphone 2, FIG. 2) | 4. Bumping elbow or arm cramp | 4. "My arm (elbow) hurts". |
| 5. Flexing neck (sensor $1^1D^1$, $1^1E^1$, FIG. 3) and rubbing with hand (sensor $1^1F^1$) | 5. Neck strain or kink | 5. "My neck is stiff". |
| 6. Waving arm in simulated swing | 6. Intends or wants to play tennis (golf, or swim) | 6. "I'd like to play tennis (golf or swim)." |

From a less significant viewpoint, but perhaps a commercially interesting tack, elementary sounds from apparently less intelligent animals, such as cats and dogs, etc., may be similarly used to develop "speaking" toy attachments to collars for pleasing the owners; responding, for example, to a cat purring sound picked up by a miniature version of FIG. 1, for example, and triggering human language sentences such as "I want to be cuddled", "pick me up", or "keep cuddling me", etc.; and an occasional "meow" triggering "I need attention" or "where is my food", etc.; and a more continuous "meowing" creating phrases such as "I'm not happy", etc. Similarly, video/audio recordings of the "communication" between humans and animals as produced in accordance with the invention, may also be entertaining.

Equipment components and implementations are extremely well-known, though not heretofore arranged, configured or adapted for the specific purposes of the invention. For such purposes, exemplary suitable such devices include, as illustrations: Motorola AN 1517 semiconductor pressure and movement sensors and signal processing circuitry (see Motorola document AN 1517D, 1995); Motorola AN1326 temperature-compensated semiconductor pressure sensors, microcontroller unit and software for signal conditioning (see Motorola document AN 1326/D., 1993); and Information Storage Devices ISD1100 "Chip Corder" series of single chip voice recorder/playback device with microphone, speaker-amplifier, non-volatile memory cells and high-quality solid-state voice reproduction (see ISD ISD100 "Chip Corder" Series bulletin, April 1998).

Further modifications will also occur to those skilled in this art and such are considered to fall within the spirit and scope of the invention as defined in the appended claims.

What is claimed is:

1. A method of improving communication and understanding between humans capable of speaking and listening to audible language words and phrases of human-cognitive intelligent meaning, and animals capable of producing varied signals including gestures and emitted sounds of human-audible detectable frequencies and of frequencies outside the human-audible range and that are associated with varied animal behavioral functions, responses to stimuli and intentions, the method comprising, sensing, monitoring and storing varied animal signals including patterns of gestures and sounds, while observing the corresponding simultaneous varied behavioral functions, responses and intentions associated substantially with such signals and patterns; correlating the stored signals including the sound patterns as observed to be associated with the corresponding behavioral functions, responses and intentions, and creating a stored library data base therefrom; recording in audible human language, sets of words and phrases correspondingly descriptive of what a human would audibly say or describe if it were the human who was performing the same behavioral functions, responses and intentions; correlating the varied human language recordings with the varied correlated animal sounds and patterns stored in the data base corresponding to those behavioral functions, responses and intentions; associatively storing the correlated recorded sets of human words and phrases, in the data base; and, during subsequent real-time interacting with such animals or studying visual recordings thereof, automatically playing back audibly the correlated recorded set of human words and phrases identifying the animal's actual subsequent performance of the corresponding behavioral function, response and intention; and effecting such audible playback at the body of the animal simultaneously during such subsequent performing of such behavioral function by the animal in real time as if the animal were conducting back and forth communication on an ongoing real time basis.

2. The method of claim 1 wherein the sensing, storing, recording and audible playback are effected on the person of the animal, and positioned thereon, such that the audibly played back human words and phrases appear to come from the animal during said subsequent performing of such behavioral function.

3. The method as claimed in claim 2 and in which the audible playback is adjusted to a level that is discernable over any naturally emitted animal sounds.

4. The method as claimed in claim 3 and in which a further recording is produced for viewer entertainment, documenting the audible human language communication interchange between human and animal.

5. The method as claimed in claim 2 and in which the behavioral function is accompanied by emitted animal sounds in the human audible spectrum and outside such spectrum.

6. The method as claimed in claim 5 and in which the sounds outside such spectrum are monitored by heterodyning the same to such audible spectrum.

7. The method as claimed in claim 2 and in which the behavioral function involves animal gesturing movements or body language.

8. The method as claimed in claim 2 wherein the animals include dolphins.

9. The apparatus as claimed in claim 2 and in which a video/audio recording is produced for viewer entertainment, documenting the audible human language communication interchange between human and animal.

10. Apparatus for improving communication and understanding between humans capable of speaking and listening to audible language words and phrases of human-cognitive intelligent meaning, and animals capable of producing varied signals including gestures and emitted sounds of human-audibly detectable frequencies and outside the human audible range, and that are associated with varied animal behavioral functions, responses and intentions, said apparatus having, in combination, a microprocessor provided with a storage data base comprising a catalog of said varied animal-produced signals as correlated with corresponding animal behavioral functions, responses and intentions, and a corresponding set of recorded human language sets of words and phrases correspondingly descriptive of what a human would say or describe if the human were performing the same behavioral functions, responses and intentions and correlated therewith; and means positioned at the body of the animal operable to sense and monitor the interacting with such animals and controlled by said microprocessor for automatically playing back audibly the correlated recorded set of human words and phrases in response to the sensing of the animal's actual subsequent performance of the correlated behavioral function, response and intention; simultaneously during such subsequent performing of such behavioral function by the animal in real time as if the animal were conducting back and forth communication on an ongoing real time basis.

11. The apparatus as claimed in claim 10 wherein each of the microprocessor sensing, storing and audible playing back is effected on the person of the animal, and positioned thereon such that the audibly played back human words and phrases appear to come from the animal.

12. The apparatus as claimed in claim 11 and in which the behavioral function is accompanied by emitted sounds in the human audible spectrum and outside the audible spectrum.

13. The apparatus as claimed in claim 12 and in which the sounds outside such spectrum are monitored by means for heterodyning the same into the audible spectrum.

14. The apparatus as claimed in claim 10 and in which means is provided for adjusting the playback level discernibly to be heard above any naturally emitted animal sounds.

15. The apparatus as claimed in claim 10 and in which the behavioral function involves animal gesturing movements or body-language.

16. The apparatus of claim 10 wherein said microprocessor comprises a sensor and audio play-back electronic chip attached on the body of the animal.

17. The apparatus of claim 16 wherein the positioning of the chip involves implanting the same at a body part.

18. The apparatus of claim 10 wherein the microprocessor comprises a plurality of sensors positioned at widely different separate parts of the body of the animal simultaneously monitoring the different behavorial functions at such separate parts.

19. The method of claim 18 wherein an audio playback electronic chip is positioned on a body part as a common play-back chip to service multiple sensors placed at different parts of the body, simultaneously to sense the subsequent corresponding different behavioral functions of the animal thereat.

20. The method of claim 18 in which said different parts for positioning the different sensors include the mouth, the head and neck, the eye, the ear, a shoulder and stomach.

21. A method of enabling improved communication and understanding between humans capable of speaking and listening to audible language words and phrases of human-cognitive intelligent meaning, and impaired humans defective at least in such speaking capability, but capable of providing varied signals including gestures and/or emitted sounds that are associated with varied behavioral functions, responses and intentions at a plurality of different and widely separated parts of the body, said method comprising, sensing, monitoring and storing the varied impaired-human signals corresponding to the respective behavioral functions sensed at each of said different and widely separated body parts, including patterns of gestures and/or sounds, while observing the corresponding simultaneous varied behavioral functions, responses and intentions associated substantially with such signals and patterns at said different and widely separated body parts; correlating the stored signals including the gesture and or/sound patterns as monitored to be associated with the corresponding behavioral functions, responses and intentions at said different and widely separated body parts, and creating a stored library data base therefrom; recording in audible human language, sets of words and phrases correspondingly descriptive of what a normal human might generally audibly say or describe if it were the normal human who was performing the same behavioral functions, responses and intentions as performed by the impaired human; correlating the varied language recordings with the varied correlated gesture and/or sound patterns stored in the data base, and storing the correlated recorded sets of words and phrases in the data base; and, during subsequent interacting with the speech-impaired human, simultaneously sensing and monitoring, in real time, at each of said different and widely separated body parts, the performing of the respective behavioral functions at each of the different and widely separated body parts and automatically playing back audibly the correlated recorded set of words and phrases identifying the actual performance of the corresponding behavioral function, response or intention at each of the corresponding different and widely separated body parts of the impaired human, and effecting such audible playback at the body of the impaired human in real time as if conducting back and forth communication between said capable and said impaired humans on an ongoing real time basis.

22. The method of claim 21 wherein each of the sensing, storing, recording and audible playback are effected on the person of the impaired human, and positioned thereon such that the audibly played-back human words and phrases appear to come from the body of the impaired human in response to the respective sensing of the behavioral function at each of said different parts of the body.

23. The method of claim 21 wherein the emanation of the played back pre-recorded human language phrases is effected by positioning an audio play-back electronic chip on the body of the speech-impaired human.

* * * * *